United States Patent [19]

Lakoski et al.

[11] Patent Number: 4,918,952
[45] Date of Patent: Apr. 24, 1990

[54] COMPUTER DATA DRIVE LOCKING DEVICE

[75] Inventors: Robert P. Lakoski, Austin, Tex.; Jody L. Numbers, Tempe, Ariz.

[73] Assignee: Lama Systems, Inc., Austin, Tex.

[21] Appl. No.: 227,129

[22] Filed: Aug. 2, 1988

[51] Int. Cl.⁵ .............................................. E05B 65/00
[52] U.S. Cl. ............................................. 70/57; 70/158
[58] Field of Search ............... 70/14, 57, 58, 158–173, 70/455

[56] References Cited

U.S. PATENT DOCUMENTS

| | | | |
|---|---|---|---|
| 452,903 | 5/1891 | Cosman | 292/298 |
| 979,167 | 12/1910 | Hutchinson | 292/298 |
| 1,789,756 | 1/1931 | Jacobi | 70/455 X |
| 3,096,409 | 6/1960 | Hubbell | 70/161 |
| 3,131,985 | 5/1964 | Blonder | 70/57 X |
| 3,475,929 | 11/1969 | Weingart | 70/14 |
| 3,888,096 | 6/1975 | Huss | 70/209 |
| 4,031,722 | 6/1977 | Michelman | 70/371 |
| 4,131,001 | 12/1978 | Gotto | 70/14 |
| 4,169,619 | 10/1979 | McCracken | 292/290 |
| 4,248,069 | 2/1981 | Burbank | 70/160 |
| 4,326,394 | 4/1982 | Stein | 70/14 |
| 4,462,233 | 7/1984 | Horetzke | 70/14 X |
| 4,527,405 | 7/1985 | Renick | 70/14 |
| 4,593,541 | 6/1986 | Hollis | 70/57 |
| 4,685,312 | 8/1987 | Lakoski | 70/14 |
| 4,773,243 | 9/1988 | Lukich | 70/455 X |

FOREIGN PATENT DOCUMENTS 8105741 12/1981 Netherlands.
2131219 6/1984 United Kingdom.

Primary Examiner—Gary L. Smith
Assistant Examiner—Suzanne L. Dino
Attorney, Agent, or Firm—Leydig, Voit & Mayer

[57] ABSTRACT

A permanent locking device is provided for securing a computer disk drive unit which features a disk drive bezel incorporating a rotatable lock having a shaft extending behind the bezel and a blocking bar connected to the shaft to rotate between a locked position where the bar blocks the slot and engages the computer body to an unlocked position to allow access to the diskette slot.

6 Claims, 1 Drawing Sheet

COMPUTER DATA DRIVE LOCKING DEVICE

TECHNICAL FIELD

This invention relates to computer security devices and, more particularly, to bezels containing a permanently mounted rotating locking device to deter unauthorized access to or removal of data from computer drive mechanisms.

BACKGROUND OF THE INVENTION

The need for computer security is clearly evident from numerous articles in many publications identifying problems of data misappropriation, destruction, etc. The problem of providing a simple expedient to deter or prevent unauthorized access to computer drives for the purpose of data theft, introduction of computer viruses to the system, etc., has not been subject to resolution, especially in the original equipment markets. Applicant's patent, U.S. Pat. No. 4,685,312 issued Aug. 11, 1987 addresses aspects of computer security problems and describes retrofit mountable or portable devices to solve those problems. Since the descriptions in that patent are relevant to certain aspects of this invention, the content of that patent is incorporated by reference herein.

SUMMARY OF THE INVENTION

It is an object of the present invention to provide a permanently mounted, locking device for a personal computer.

It is another object of this invention to provide a computer drive locking device for diskettes or cartridges which prevents unauthorized access to a computer.

Still another object of this invention is to provide a lockable bezel unit that cannot be forcibly removed from the computer without causing damage thereto.

Yet another object of certain embodiments of this invention is to provide locking bezels which are employable for optical, floppy, or 3½" rigid disk drives as well as RAM-type cartridge drives.

It is still another object of certain embodiments of the invention to provide a permanent locking device which conforms to the configuration of the disk drive unit thereby not requiring its removal for proper functioning of the unit.

These and other objects are satisfied by a computer data drive locking device for a computer having a data storage or receiving slotted access member and having a chassis surrounding the member, where the chassis has a front opening. The device includes a slotted bezel dimensioned to cover the front opening of the chassis, mounting means for attaching the bezel to the chassis, and a reinforced lock-plug receptacle formed in the bezel. A key-actuated lock-plug is seated in the receptacle of the bezel and capable of rotation relative to the receptacle. Connected to the lock-plug is a locking bar which is capable of movement between a slot-blocking position and a slot-unblocking position. The locking bar is located behind the bezel. With the foregoing components actuating the lock-plug moves the blocking means to the blocking position to block the bezel slot and the slotted access member of the computer. Hence, unauthorized introduction of articles to or removal of articles from the slotted access member is prevented.

Therefore, this invention presents a simple, permanently mounted locking device which impedes direct access to a data drive unit. Moreover, the device is readily adaptable for both retrofit and installation on original equipment. Furthermore, the invention deters theft of data located on or downloadable on a disk as well as unauthorized introduction of a diskette containing a computer virus. Additionally, the invention, when in the blocking position, deters undetectable removal or theft of the disk drive bezel and prevents introduction of nonconforming items, as for example, by a child, into a drive unit.

These and other advantages of the invention will become apparent to the skilled artisan upon review of the following description.

DETAILED DESCRIPTION OF THE ILLUSTRATED EMBODIMENTS

The below-described embodiment is illustrated in the form of a retrofit computer security locking bezel configured for a 3½" rigid diskette conforming to an IBM® System/2 (IBM is a registered trademark of International Business Machines, Inc.). It should be clear from the following description that the invention is adaptable to any number of drive or cartridge conformations. Thus, the following description is provided for the purpose of illustration and not limitation.

Figure 1:
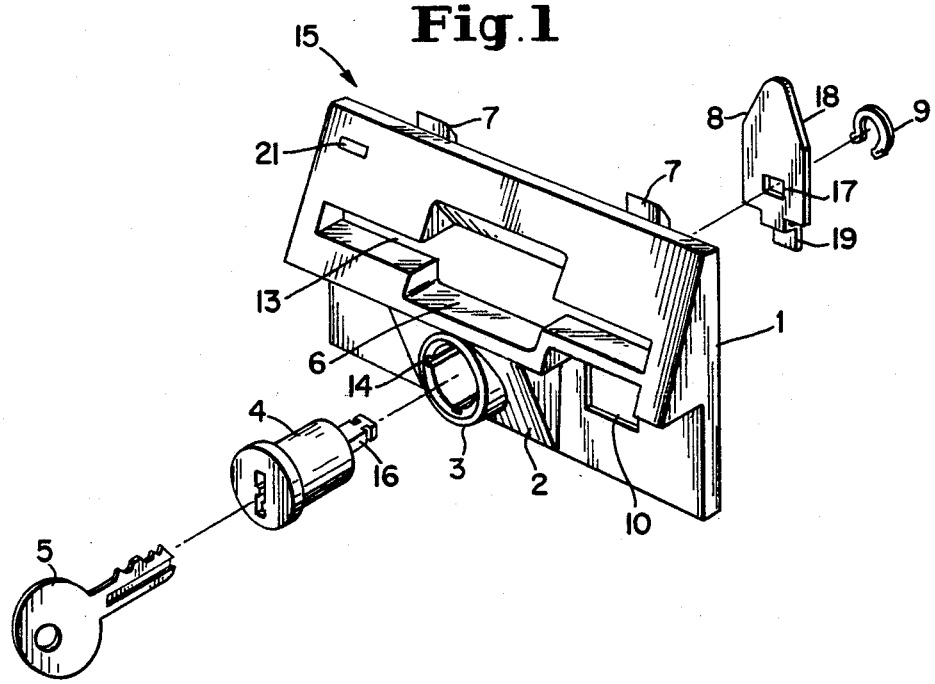
FIG. 1 is an assembly view of an embodiment of the invention.

In FIG. 1, security device 15 is illustrated. Embodiment 15 includes molded plastic disk drive bezel 1 which features slot 13, reinforced lock-mount 2, grooved lock receptacle 3, reinforced gusseted hooks 7, table 6, and elongated plastic hooks 11 projecting from the back. Slidably received within lock receptacle 3 is lock-plug 4. Receptacle 3 is grooved and lock-plug 4 contains a matching projection so when lock-plug 4 is seated in receptacle 3, groove 14 and the projections coact to prevent rotation beyond 90° of lock-plug 4 relative to reinforced angled lock-mount 2. Key-actuated, lock-plugs acceptable for use in this invention are manufactured by Medeco Security Locks, Inc. of Salem, Va. and generally designated as 3, 4 or 5 pin tumbler security cam locks. In the event of selection of these lock-plugs, receptacle 3 should include two axial grooves disposed 90° relative to each other within the cylindrical bore.

Attachment of bezel 1 to the front of a computer is accomplished by sliding the bezel into the conforming front opening, catching reinforced/gusseted hooks 7 behind the front lip of the opening and engaging hooks 11 on a lower protrusion or lip conventionally located on the upper surface of the computer base. Hooks 7 are reinforced to prevent the hooks from bending and releasing bezel 1 from the computer chassis.

Figure 2:
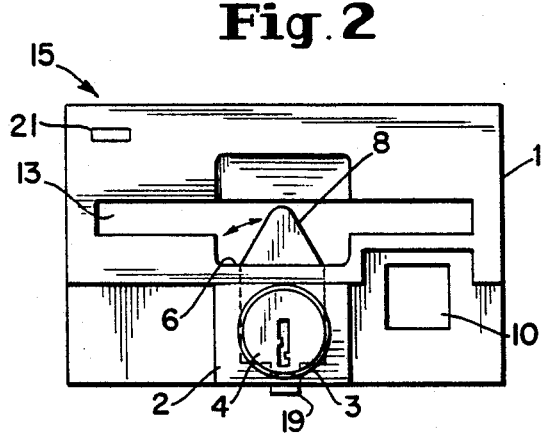
FIG. 2 is a front view of the invention illustrated in FIG. 1.
Figure 3:
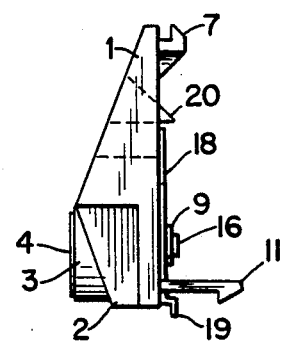
FIG. 3 is a side view of the invention illustrated in FIG. 1.
Figure 4:
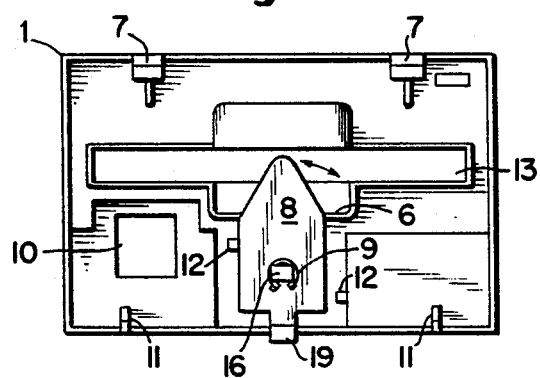
FIG. 4 is a back view of the invention illustrated in FIG. 1.

Moving to FIGS. 2, 3 and 4, the structure of rotatable locking bar 8, as associated with lock-plug 4, is depicted. Locking bar 8 comprises three principal features, bar 18, aperture 17 and lug 19. Since bar 18 must provide a secure impediment to movement of diskettes and the like into or out of slot 13, preferably it is formed of high strength plastics or nonmagnetic stainless steel. The suggested thickness of locking bar 8, if formed from steel, is approximately 60 mils (0.060 inches). The length of locking bar 8 is preferably sufficient, when in the locked position (as illustrated), to extend from just under the lowermost interior edge of the upper boundary of slot 13, depicted in FIG. 3 as lip 20, to a point below the lowermost edge of bezel 1 behind reinforced lock-mount 2. Thus, locking bar 8 rotates to extend sufficiently upwardly so that bar 18 blocks access to slot 13 and lodges next to table 6 while lug 19 projects downwardly in a manner to abut the computer chassis. For an additional measure of security, the chassis may incorporate a reinforced element, containing a slot parallel to the front edge of the chassis for seating lug 19 upon rotation. In this configuration, lug 19 serves to further secure the attachment of bezel 1 to the computer chassis by enhancing the connection established by hooks 7 and 11.

Locking bar 18 is attached to shaft 16 projecting rearwardly from rotatable lock-plug 4. Aperture 17 is dimensioned to conform to the cross-sectional configuration of shaft 16 so as to securely engage the shaft. Conventional C-clip 19, composed of brass or other suitable material and dimensioned to lock onto shaft 16, secures locking bar 18 to the shaft. It should be apparent that shaft 16 and aperture 17 should have a noncircular geometry (oblong, rectangular, etc.) to prevent accidental rotation of locking bar 18 relative to bezel 1 and lock-plug 4.

Additional features such as lugs 12 (FIG. 4) may be incorporated onto or comprise part of bezel 1 to prevent forcible rotation of locking bar 18 beyond its designed limits. Lugs 12 are positioned to abut one of the edges of bar 8 depending on whether or not the bar is in the locking or unlocking position. Lugs 12, thus, render rotation of bar 18 more difficult with a screwdriver or the like without visible signs of forced entry.

Also, it may be desirable to conform the features of bezel 1 to a particular computer on which this invention is used. For this reason, the drawing illustrates the features conforming to the System 2, namely, diskette ejector button 10 and light cover 20.

Many modifications and variations should now be apparent to the person of ordinary skill in the art, and are thus contemplated as falling within the scope and intent of this invention as defined by the following claims:

I claim:

1. A computer data drive locking device for a computer having a slotted data storage or receiving access member and having a chassis surrounding the member, where the chassis has a front opening, comprising:
   (a) a bezel dimensioned to cover the front opening of the chassis and defining a slot,
   (b) mounting means for attaching said bezel to the chassis,
   (c) a reinforced lock-plug receptacle formed in and extending through said bezel, said receptacle containing an elongated groove,
   (d) a key-actuated lock-plug seated in said receptacle and capable of rotation relative to said receptacle, said lockplug containing an elongated projection corresponding to said groove where said projection and groove restrict the rotation of said lock to a preselected limit and further comprising lug means on said bezel to restrict rotation of said locking bar to the preselected limit,
   (e) a locking bar connected to said lock-plug and capable of movement between a slot-blocking position and a slotunblocking position, said locking bar being located behind said bezel,
   (f) where actuating said lock-plug moves said locking bar to the blocking position to block said bezel slot and the slotted access member of the computer to prevent introduction of articles to or removal of articles from the slotted access member.

2. A locking device according to claim 1 where said lock-plug includes a shaft having a noncircular geometric cross-section which extends behind said bezel and said locking bar possesses an aperture having a corresponding geometric cross-section where said locking bar is attached to said shaft through said aperture and secured to the shaft.

3. A locking device according to claim 2 where said locking bar is dimensioned to block the central portion of the slot behind said bezel.

4. A locking device according to claim 3 where said locking bar includes a computer chassis engaging element which engages the chassis when said locking bar is in the blocking position.

5. A computer disk drive locking device for a computer featuring an open front housing and a slotted disk drive, comprising:
   a molded bezel dimensioned to cover the housing front for snap fitting to the housing, said bezel having a slot for overlying the slotted disk drive, at least one reinforced upper hook formed proximate to the upper portion of the bezel for engaging the border of the computer housing front opening, at least one elongated hook formed proximate to the lower portion of the bezel engaging the computer housing, and a reinforced receptacle for seating a rotatable lock extending through the bezel, said receptacle including at least one elongated axial groove;
   a rotatable lock dimensioned to be contained in said receptacle, said lock including a rotatable shaft extending beyond said bezel, said shaft having a noncircular cross-section, said lock having at least one axially, disposed projection for coacting with said axial groove to limit the rotation of said lock to a predetermined range of angles, and
   a rotatable locking bar attached to said shaft in a manner to restrict rotation of said bar to the predetermined range of angles where the locking bar is movable between a slot-blocking position and a slotunblocking position, said locking bar including a hook member for engaging the computer housing when in the slotblocking position.

6. A locking device according to claim 5 where said locking bar is dimensioned to block the central portion of the slot behind said bezel.

* * * * *